United States Patent [19]
Lecerf et al.

[11] Patent Number: 4,975,346
[45] Date of Patent: Dec. 4, 1990

[54] RECHARGEABLE ELECTROCHEMICAL BATTERY INCLUDING A LITHIUM ANODE

[76] Inventors: André Lecerf, 34 avenue Le Brix, 35740 Pace; Francis Lubin, I.N.S.A., 35000 Rennes; Michel Broussely, 53 avenue de Poitiers, 86240 Liguge, all of France

[21] Appl. No.: 357,531

[22] Filed: May 26, 1989

[30] Foreign Application Priority Data

Mar. 9, 1989 [FR] France ................ 89 03102

[51] Int. Cl.⁵ .................. H01M 4/50; H01M 10/40
[52] U.S. Cl. ........................ 429/197; 429/224
[58] Field of Search ................ 429/197, 224

[56] References Cited

U.S. PATENT DOCUMENTS 4,740,433  4/1988  Lu ........................... 429/197
4,758,484  7/1988  Furukawa et al. ........... 429/197

Primary Examiner—Donald L. Walton
Attorney, Agent, or Firm—Kenyon & Kenyon

[57] ABSTRACT

A rechargeable electrochemical battery including a lithium anode.

A rechargeable electrochemical battery wherein the anode 2 is a lithium base and the electrolyte is composed of a solution of a lithium salt in a non-aqueous solvent. The active material of cathode 1 is a manganese dioxide containing lithium ions and displaying the crystallographic structure of α manganese dioxide known as cryptomelane.

5 Claims, 15 Drawing Sheets

RECHARGEABLE ELECTROCHEMICAL BATTERY INCLUDING A LITHIUM ANODE

This invention relates to a rechargeable electrochemical battery including a lithium anode and a non-aqueous electrolyte, wherein improvements in performance are achieved through the use of an appropriate cathode.

Numerous metal oxides and sulfides have been proposed for use as active cathode materials in batteries of the foregoing type. These oxides include manganese dioxide, $MnO_2$, which has been extensively tested; indeed, this material is inexpensive, readily available and non toxic. $MnO_2$ is widely used as a cathode in primary batteries, but it has become apparent that the dioxides employed in these batteries are not suitable for use in rechargeable batteries. The fundamental reason is that irreversible structural changes in the the oxide are produced during discharge.

It is known that oxides having a spinel structure, for example, $LiMn_2O_4$, $Li_{1-x}Mn_2O_4, \lambda MnO_2$ may be used as active cathode materials in rechargeable batteries. However, the specific capacity of this type of battery decreases rapidly after a few cycles.

Manganese oxides $\alpha MnO_2$ have also been experimentally used as cyclable cathode materials. However, in these case, rapid decreases in capacity are also observed in the course of cycling. These decreases are probably due to elimination of large ions $K^+$ or $NH_4^+$ which stabilize the $\alpha$ structure.

The object of this invention is a new type of cyclable active material displaying improved performance in a rechargeable electrochemical battery including a lithium anode.

The object of this invention is a rechargeable electrochemical battery having an anode made of lithium or a lithium alloy and an electrolyte composed of a solution of a lithium salt in a non-aqueous solvent, wherein the cathode material of said battery is a manganese dioxide containing lithium ions and displaying the crystallographic structure of $\alpha$ manganese dioxide known as cryptomelane.

Preferably, the atomic ratio Li/Mn substantially ranges from 0.1 to 0.5.

An examination of the X-ray diffraction diagram of the cathode material according to the invention reveals that the peaks are characteristic of an $\alpha MnO_2$ structure displaying a shift in these peaks and changes in intensity relative to the known diagram of the dioxide $\alpha MnO_2$.

Chemical analysis shows that the material of the invention does in fact contain lithium.

The non-aqueous electrolyte of a battery according to the invention is composed of a solvent selected from the group consisting of linear or cyclic ethers, esters or mixtures thereof, and a solute selected from the group comprising $LiAsF_6$, $LiCF_3SO_3$, $LIBF_4$, $LiPF_6$, $LiClO_4$ and mixtures thereof.

Preferably, the electrolyte is a solution of $LiAsF_6$ in a mixture of propylene carbonate, ethylene carbonate.

According to a variation, the electrolyte is a solution of $LiAsF_6$ in a mixture of propylene carbonate, ethylene carbonate and dimethoxyethane.

A further object of this invention is a process of making the foregoing cathode material.

This process consists of heating a mixture of manganese dioxide having an $\alpha$ structure and a lithium compound to a temperature ranging from 300° C. to 400° C. inclusive, wherein the proportion of lithium ranges from 0.1 to 0.5 mole of lithium per mole of manganese; preferably, this proportion is 0.5 mole of lithium per mole of manganese.

The heating phase produces a chemical reaction between $\alpha MnO_2$ and the lithium compound. After reaction, the product is washed in water to eliminate any excess of the lithium compound which may not have reacted.

The heating time is such that no solid manganese oxide phase other than the dioxide $\alpha MnO_2$ may form during the reaction process, more particularly, no $LiMn_2O_4$ or $Li_2MnO_3$. This time may be on the order of 12 hours. The presence of the above cited solids may be easily identified in an X-ray diffraction diagram.

The lithium compound may be selected from the group consisting of $LiOH$, $Li_2O$, $Li_2CO_3$, $LiI$, $LiBr$.

The $\alpha$ manganese dioxide introduced into the said mixture may be obtained by reaction of manganese sulfate $MnSO_4$ with ammonium persulfate. It may also be obtained by reaction of manganese sulfate $MnSO_4$ with potassium permanganate.

Other characteristics and advantages of this invention shall be made apparent in the following description of various embodiments, which are provided for purposes of illustration and are not to be construed as limiting examples. In the appended drawing.

In order to test the electrochemical properties of the materials according to the invention compared to those of the prior art, an accumulator of the pellet type is made in the following manner (see FIG. 1).

The cathode material is thoroughly mixed with acetylene black, graphite, PTFE in the following percentages by weight:

cathode material 80%
acetylene black 7.5%
graphite 7.5% - PTFE 5%

A cathode 1 is made by inlaying a certain amount of this mixture on an aluminum screen. After drying and cutting the material with a suitable tool, an electrode is produced in the shape of a disk having a diameter of 16 mm and a thickness of 0.5 mm. The anode 2 is composed of a lithium disk having a diameter of 20 mm and a mass of approximately 110 mg.

The electrolyte solvent is composed of a mixture of propylene carbonate, ethylene carbonate and dimethoxyethane in proportions of 25 weight percent, 25 weight percent and 50 weight percent, respectively. A solute of lithium hexafluoroarseniate, for example, is then dissolved therein, in a concentration of 1 mole/liter.

The electrodes 1 and 2 are separated using a microporous polypropylene separator 3 and a reservoir separator 4 made of polypropylene fibers in the form of felt.

The assembly is placed in a cupola 5 which is hermetically sealed by a lid 6 and a gasket 8.

Figure 2:
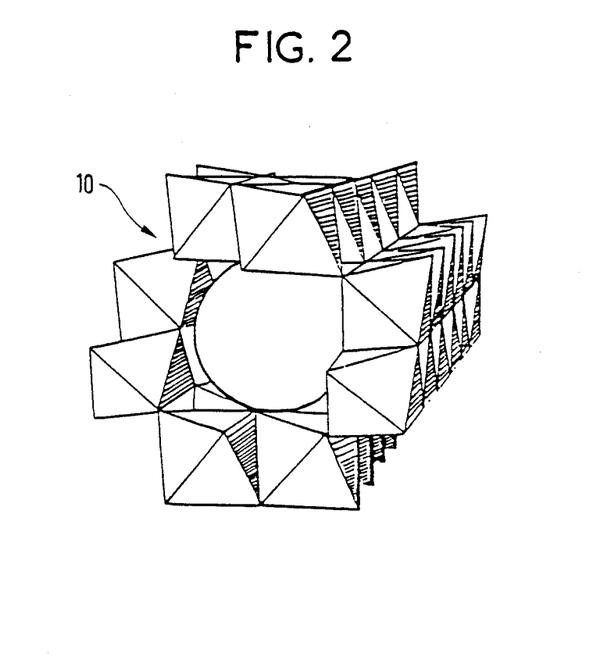
FIG. 2 shows the crystallographic structure of the known $\alpha$ manganese dioxide called cryptomelane.

FIG. 2 shows the structure of the known α manganese dioxide which is called cryptomelane, according to the description provided by E. H. Perseil and R. Giovanoli in *Schweiz Mineral Petrogr. Mitt.* 68, p. 114, 1988.

EXAMPLE 1—PRIOR ART

Figure 3A:
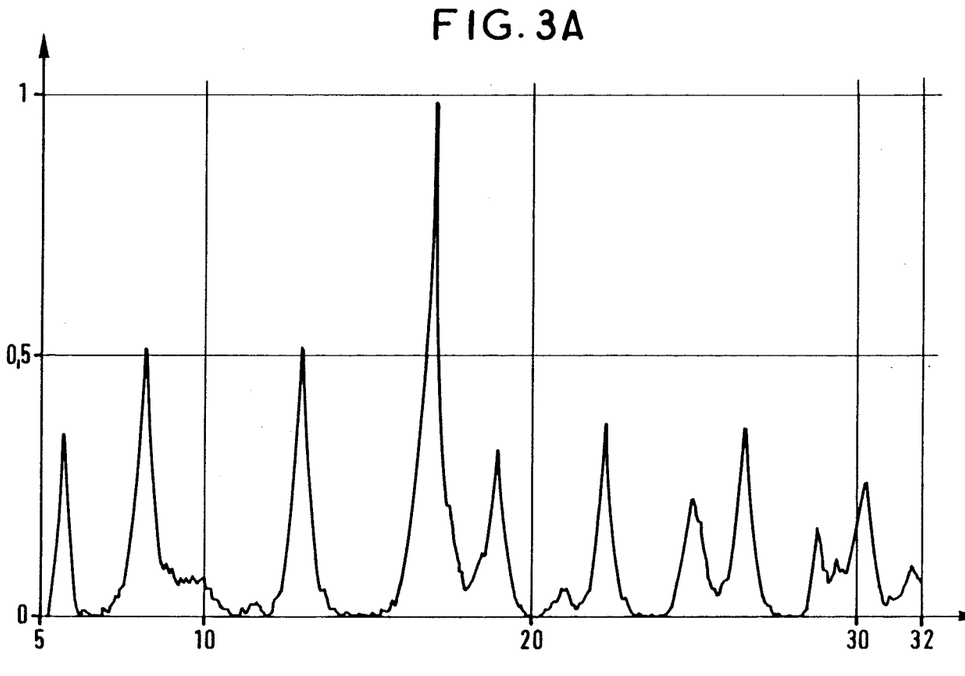
FIG. 3A shows the X-ray diffraction diagram of the $\alpha$ manganese dioxide of FIG. 2.

The prior art α $MnO_2$ dioxide is prepared as described in the literature, for example, by K. M. Parida, S. B. Kanunga and B. R. Sant, in *Electrochemica Acta* Vol. 26, pages 435 to 443. A solution of $MnSO_4$ is oxidized using ammonium persulfate. FIG. 3A shows the diffraction diagram of the resulting α $MnO_2$ dioxide.

Figure 1:
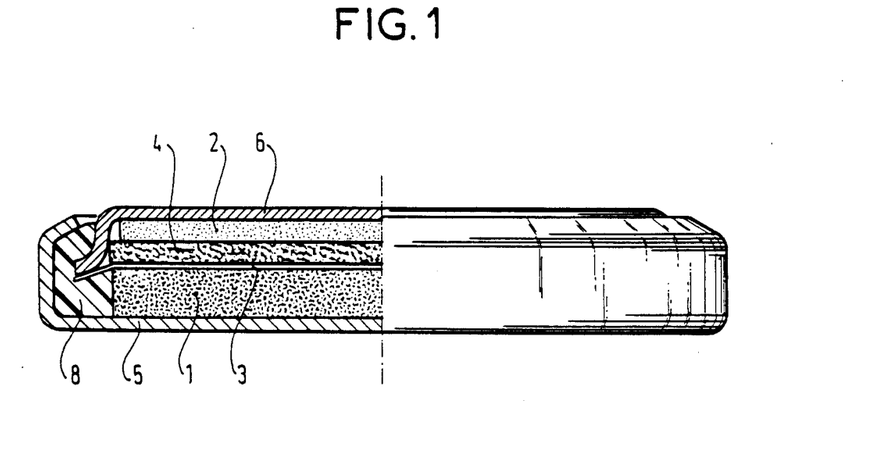
FIG. 1 is a highly schematic half-sectional view of an example of a rechargeable electrochemical battery of the pellet type.

57 mg of this product are taken and used as the cathode material of the accumulator of FIG. 1.

This accumulator is then subjected to discharge/charge cycles at a current of 1mA. The charge is applied up to a maximum voltage of 4 volts, the discharge down to a minimum voltage of 2 volts.

Figure 4:
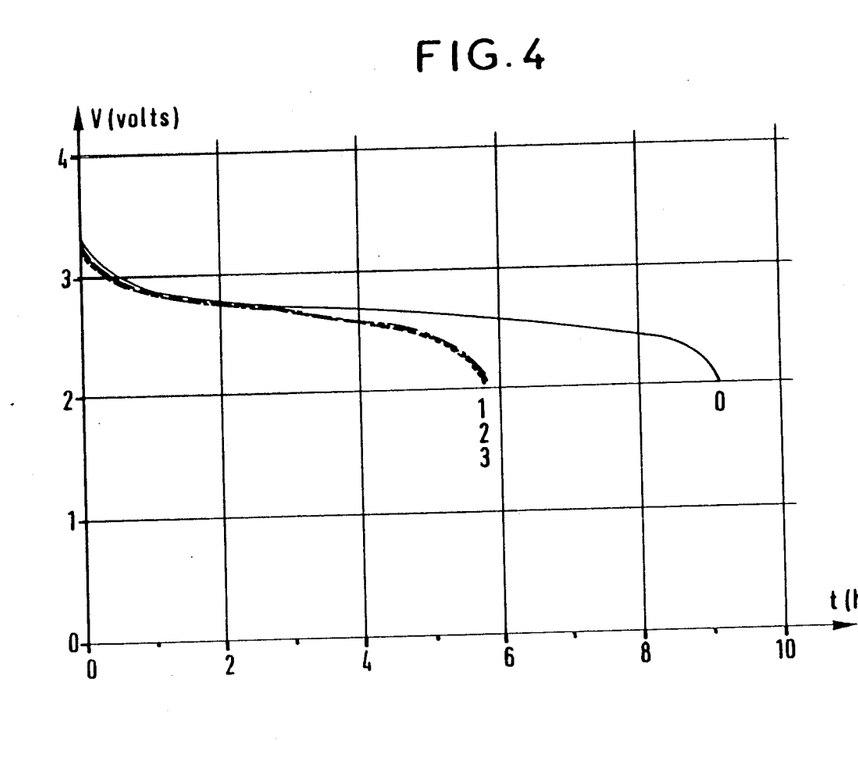
FIG. 4 shows the discharge curves (voltage V as a function of time t) of a prior art battery implementing the dioxide of FIG. 2.

FIG. 4 shows the results obtained during discharge over several cycles. The voltage V (in volts) is shown along the y-axis and time t (in hours) along the x-axis.

Figure 5:
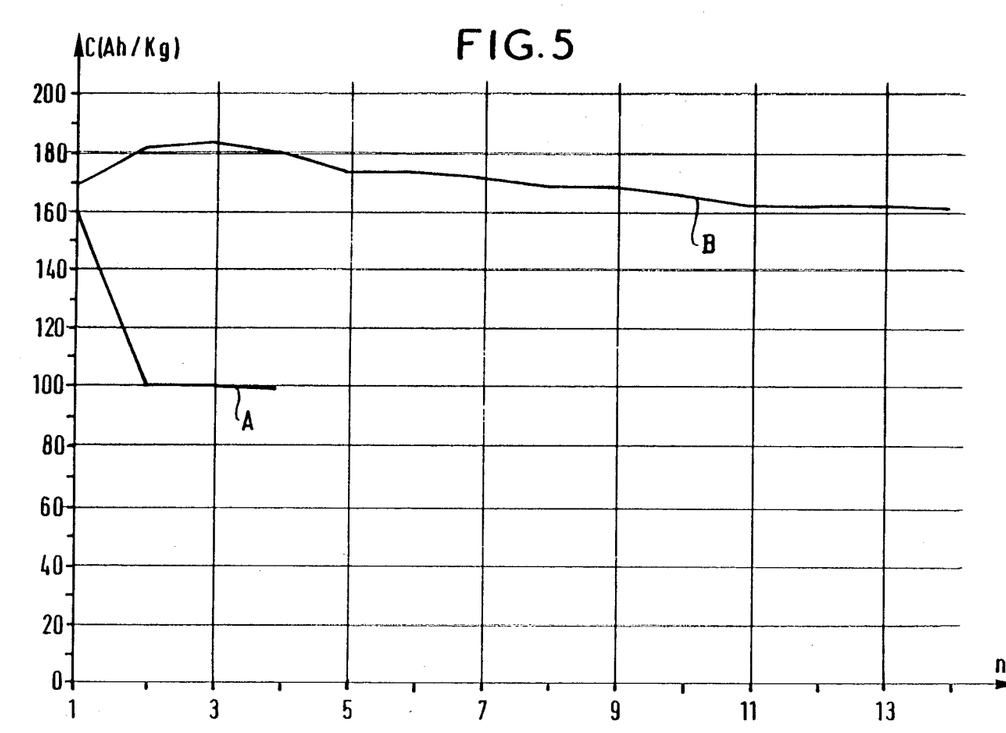
FIG. 5 shows variation curves of the specific capacity C of a prior art battery and of a battery according to the invention as a function of the number of cycles n.

The specific capacity (C) of this accumulator expressed in Ah/Kg is shown in curve A of FIG. 5 as a function of the number of cycles n. It is apparent that this capacity decreases very rapidly during the initial cycles.

Several examples of batteries according to the invention shall be described below.

EXAMPLE 2

The α $MnO_2$ is prepared as described in the foregoing, corresponding to the diagram of FIG. 3A. 40g of this α $MnO_2$ are thoroughly mixed with 8.67 g of LiOH, $H_2O$. The mixture is preferably heated a first time for 3 hours at 300° C.; the solid is rehomogenized, then heated a second time for 12 hours at 300° C. After reaction, the solid is washed in water and dried.

Figure 3B:
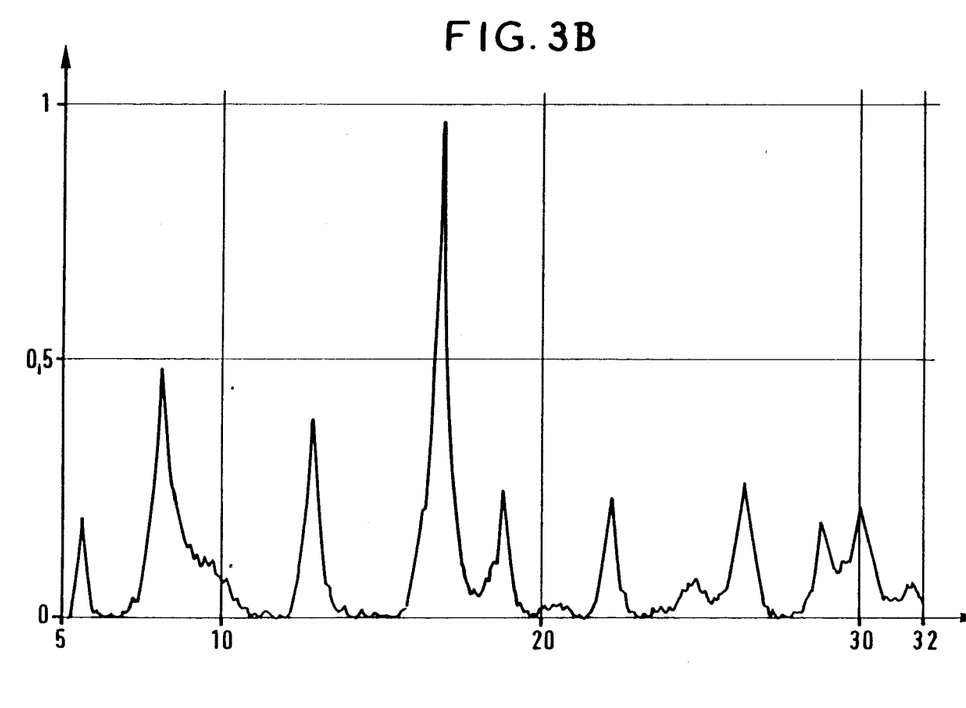
FIG. 3B shows the X-ray diffraction diagram of an example of a cathode material according to the invention.

FIG. 3B shows the X-ray diffraction diagram of the material obtained after reaction and washing.

It is apparent that the two diagrams of FIGS. 3A and 3B correspond to the α $MnO_2$ structure known as cryptomelane, but that the peaks have shifted and the intensities have changed. These differences appear more clearly on the analysis of the diagrams summarized in Table I below.

Chemical analysis shows that the resulting product contains 3.0% lithium, or a proportion of approximately 0.5 mole of lithium per mole of manganese.

TABLE I

| Before reaction | | After reaction | |
| --- | --- | --- | --- |
| d | I/I° | d | I/I° |
| 7.059 | 36 | 7.299 | 19 |
| 4.975 | 52 | 5.110 | 48 |
| 3.140 | 52 | 3.202 | 39 |
| 2.402 | 100 | 2.429 | 100 |
| 2.161 | 33 | 2.186 | 25 |
| 1.834 | 38 | 1.856 | 28 |
| 1.643 | 24 | — | — |
| 1.544 | 37 | 1.561 | 30 |
| 1.429 | 19 | 1.431 | 19 |
| 1.359 | 27 | 1.376 | 23 |

73 mg of the material according to the invention are introduced in an electrode for use as the cathode material, in a pellet-type accumulator (see FIG. 1).

This accumulator is cycled under the same conditions as the prior art accumulator.

Figure 6:
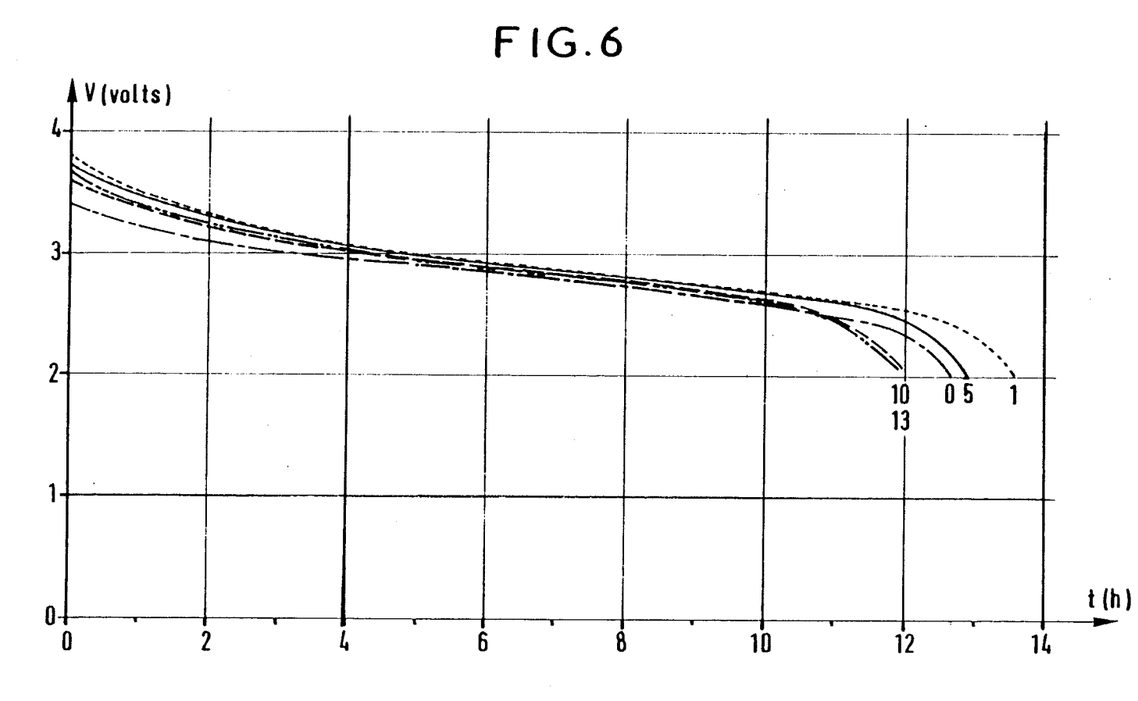
FIG. 6 shows the discharge curves of a first embodiment of a battery according to the invention.

FIG. 6 shows the results obtained during discharge over several cycles. Curve B of FIG. 5 shows that the specific capacity C is high and stabilizes after several cycles. Curves A and B clearly illustrate the advantage of the material according to the invention when compared to the α $MnO_2$ of the prior art.

EXAMPLE 3

The material according to the invention is made according to the method described in Example 2, containing a proportion of 0.3 mole of lithium per mole of manganese.

The proportions of reagents in this case are the following:

α $MnO_2$:40 g
LiOH, $H_2O$:5.38 g

Analysis indicates that the proportion of lithium is 0.29 mole of lithium per mole of manganese.

Figure 7:
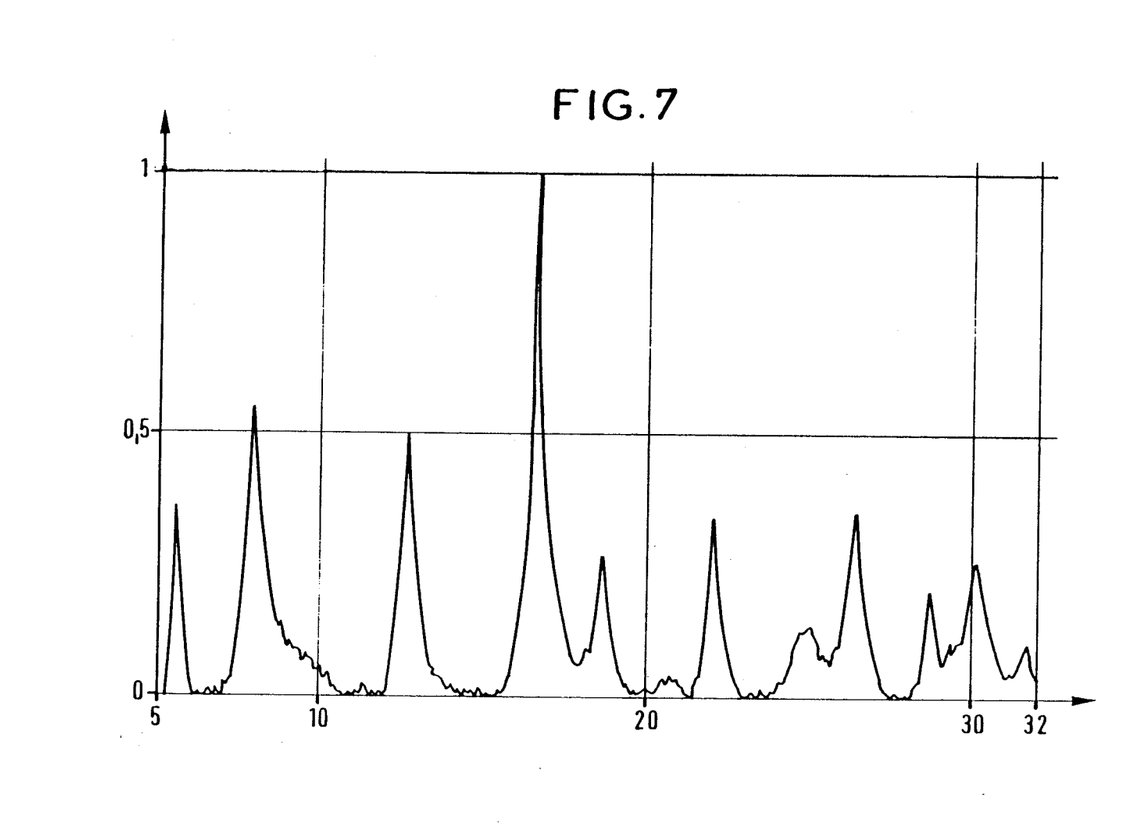
FIG. 7 shows the X-ray diffraction diagram of a further embodiment of a cathode material according to the invention.

FIG. 7 shows the X-ray diagram of the resulting compound. The structure is that of cryptomelane.

49 mg of this material were used as a cathode in a pellet-type accumulator according to the method described in the foregoing examples. This accumulator was cycled under 1mA under conditions identical to those described previously.

Figure 8:
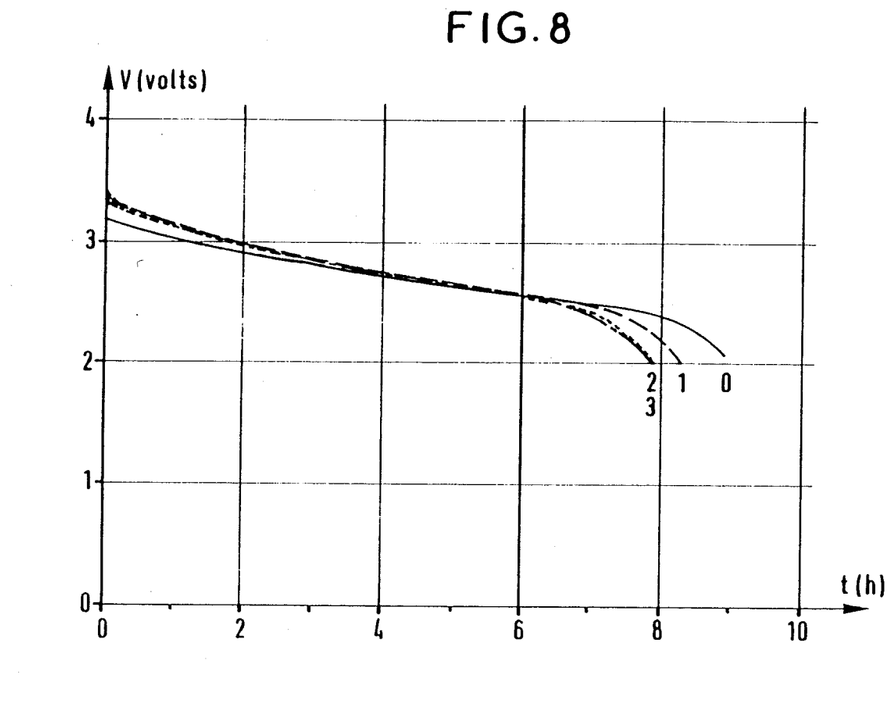
FIG. 8 shows the discharge curves of a battery according to the invention containing a cathode material corresponding to the diagram of FIG. 7.

The result obtained is shown in FIG. 8 which illustrates various discharge curves.

EXAMPLE 4

This example is identical to Example 3 except that the proportion of lithium in the material is 0.1 mole of lithium per mole of manganese. The following was used at the outset:

α $MnO_2$:40 g

LiOH, H$_2$O: 1.79 g

Figure 9:
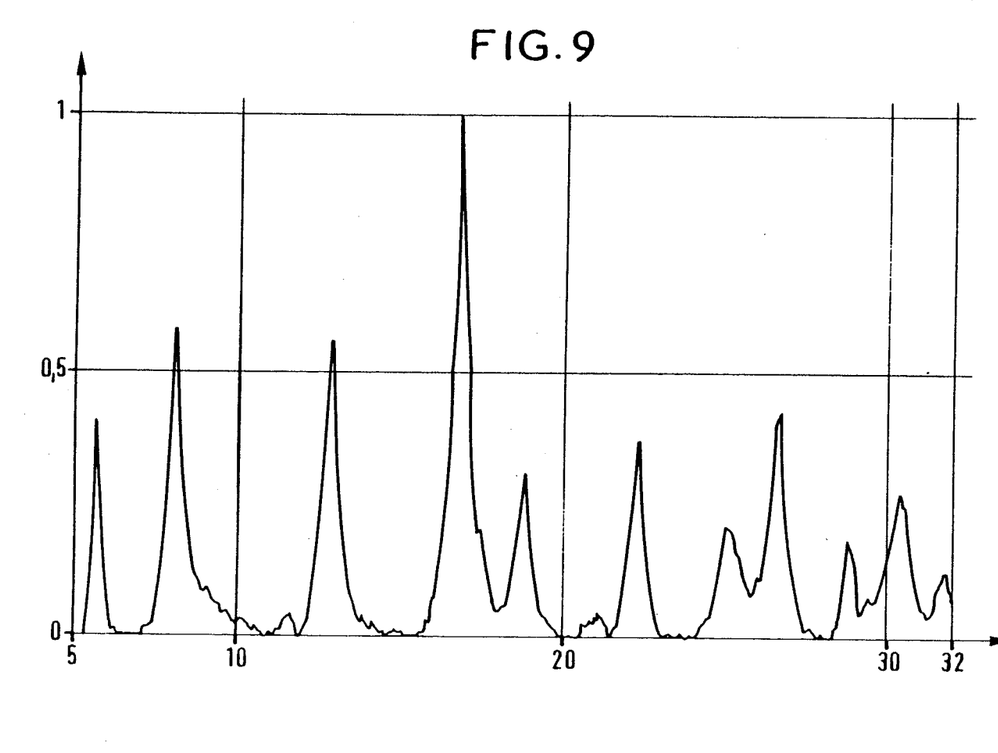
FIG. 9 shows the X-ray diffraction diagram of a further embodiment of a cathode material according to the invention.

The X-ray diagram of the material produced using the process according to the invention is shown in FIG. 9. The crystallographic structure remains the same as that of the α MnO$_2$ known as cryptomelane. Analysis indicates that the proportion of lithium is 0.11.

Figure 10:
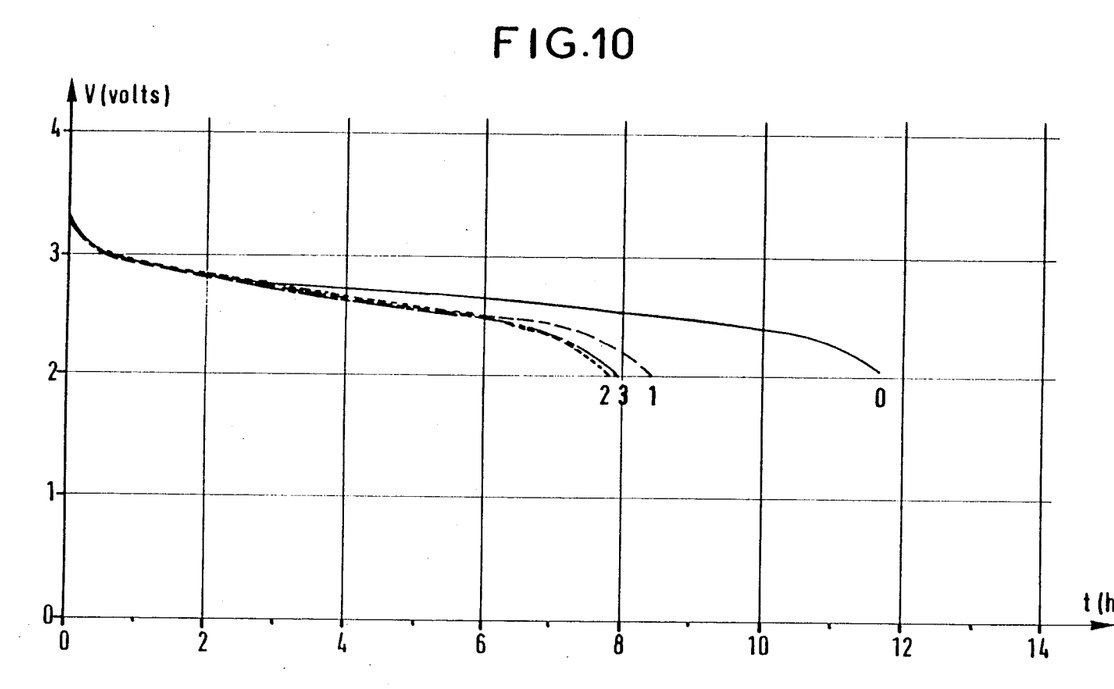
FIG. 10 shows the discharge curves of a battery according to the invention containing a cathode material corresponding to that illustrated in the diagram of FIG. 9.

58 mg of this material were used as the cathode material of the accumulator of FIG. 1. The discharge curves are shown in FIG. 10.

EXAMPLE 5

Figure 11:
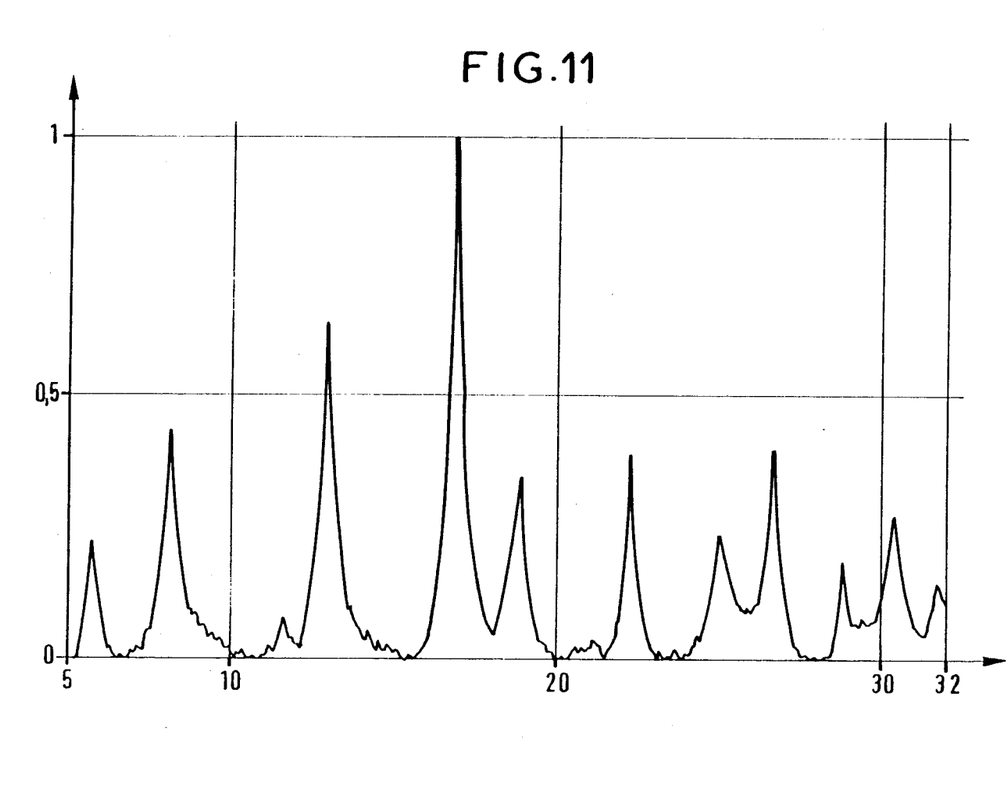
FIG. 11 shows the X-ray diffraction diagram of a known $\alpha$ manganese dioxide, prepared by a method other than the method employed to obtain the dioxide $\alpha MnO_2$ corresponding to the diagram of FIG. 3A.

The α manganese dioxide MnO$_2$ is prepared by oxidizing a solution of MnSO$_4$ with potassium permanganate KMnO$_4$ in an aqueous medium, according to a conventional process. The resulting product is described in the X-ray diagram shown in FIG. 11. This is also a dioxide α MnO$_2$ having the crystallographic structure known as cryptomelane.

61.6 mg of this material are used as the cathode material to make an accumulator using a method identical to that described in the foregoing examples.

This accumulator is then cycled at 1mA under the same conditions as the others.

Figure 12:
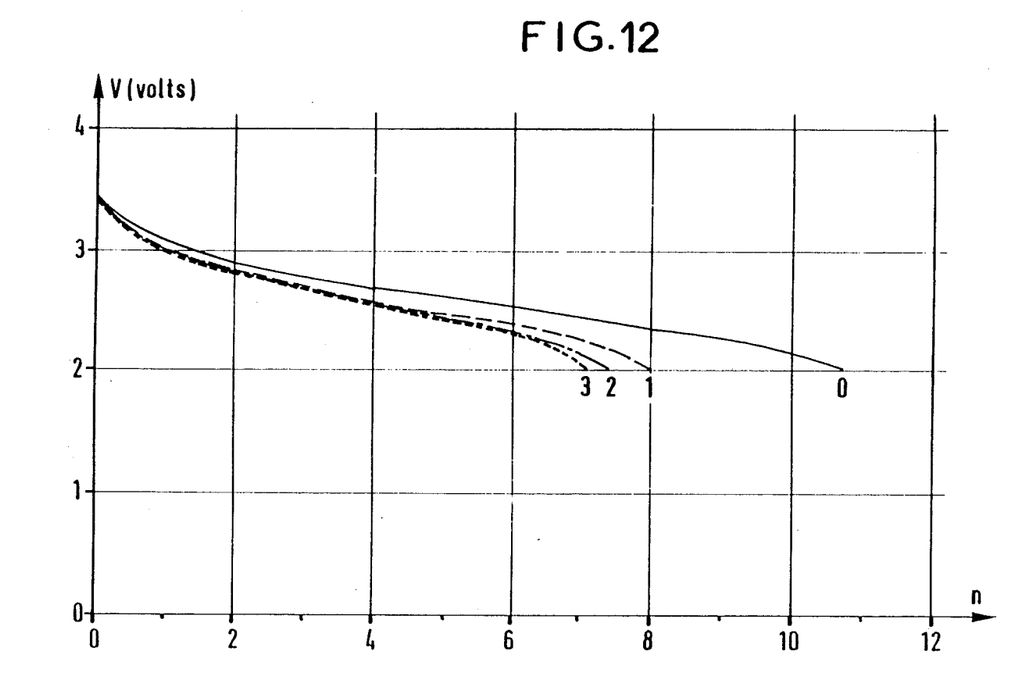
FIG. 12 shows the discharge curves of a prior art battery containing a cathode material corresponding to the diagram of FIG. 11.

FIG. 12 shows the results obtained for discharges over 4 cycles.

EXAMPLE 6

40 g of the manganese dioxide α MnO$_2$ of Example 5 are thoroughly mixed with 5.15 g of LiOH, H$_2$O. The mixture is heated at 300° C. for 3 hours. After rehomogenization, the mixture is heated a second time for 12 hours at 350° C. After reaction, the solid is washed with water and dried.

Figure 13:
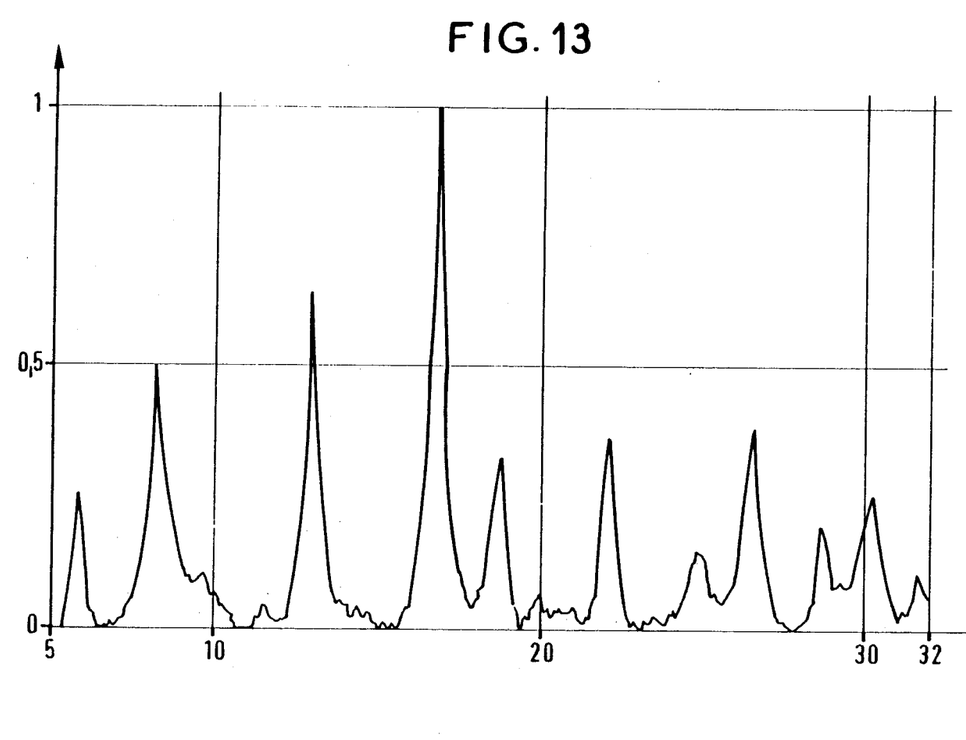
FIG. 13 shows the X-ray diffraction diagram of a material according to the invention obtained from the dioxide $\alpha MnO_2$ corresponding to the diagram of FIG. 11.

The X-ray diagram of the material obtained according to the invention is illustrated in FIG. 13. This diagram shows that the structure of the initial α MnO$_2$ is indeed preserved.

77.6 mg of this material are used to make a pellet-type accumulator using the method described in the foregoing examples. This accumulator is then cycled at 1mA under the same conditions as those described previously.

Figure 14:
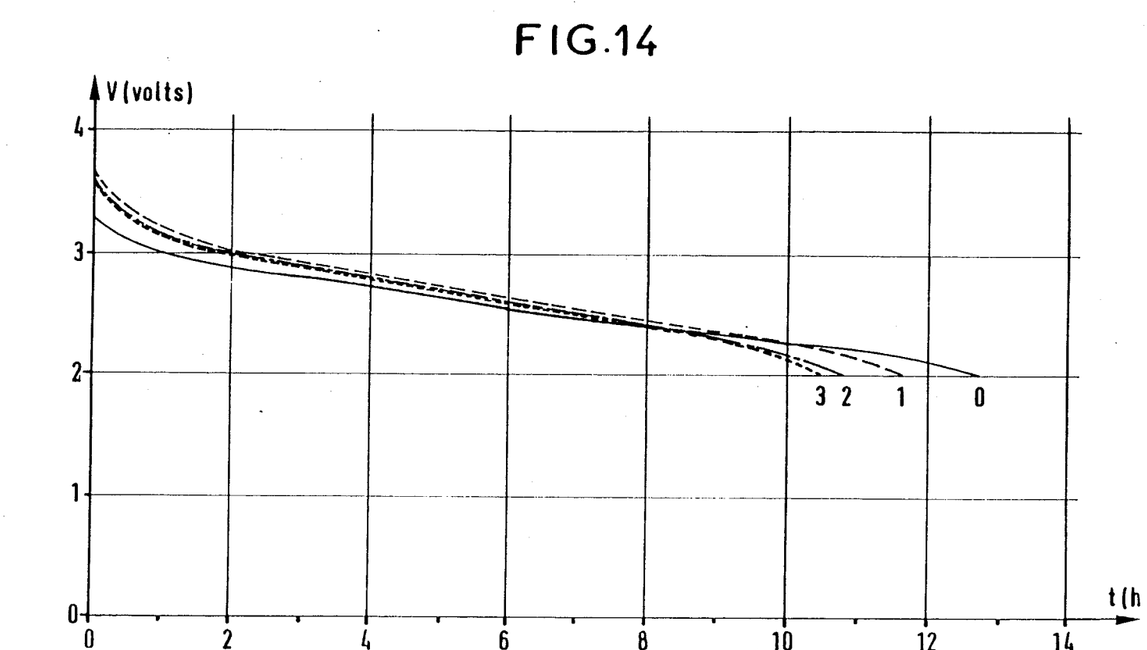
FIG. 14 shows the discharge curves of a battery according to the invention containing a cathode material corresponding to that of the diagram of FIG. 13.

FIG. 14 shows the results obtained during discharge over several cycles. Although the shape of the curves is somewhat different from that obtained using the α MnO$_2$ dioxide of Example 1, the cathode material produced in this manner may be employed as a reversible cathode.

Figure 15:
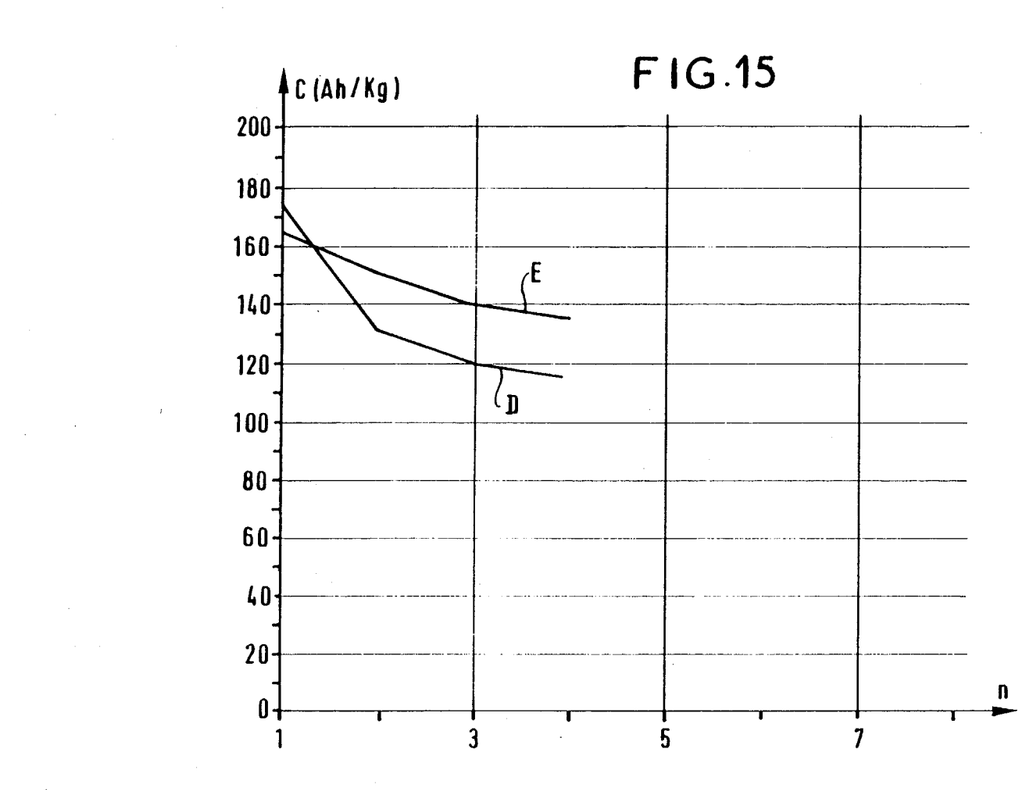
FIG. 15 shows variation curves of the specific capacity C of the batteries of FIG. 12 and FIG. 14.

The specific capacity C obtained after 4 cycles is shown in curve E of FIG. 15.

For purposes of comparison, the results obtained for the accumulator of Example 5 were transposed to curve D. It is apparent that for this accumulator, the specific capacity drops very rapidly.

Of course, the invention is not limited to the embodiments described in the foregoing.

We claim:

1. A rechargeable electrochemical cell having an anode that is made of lithium or of a lithium alloy and an electrolyte that is composed of a solution of a lithium salt in a non-aqueous solvent, wherein the improvement comprises the cell having a cathode material that is a manganese oxide containing lithium ions and displaying the crystallographic structure of the α manganese dioxide known as cryptomelane, said cathode material containing essentially no other form of manganese oxide.

2. An electrochemical cell as claimed in claim 1, wherein in said cathode material, the atomic ratio Li/Mn is in the range from 0.1 to 0.5 inclusive.

3. An electrochemical cell as claimed in claim 1 or claim 2, wherein said non-aqueous electrolyte is composed of a solvent selected from the group consisting of linear ethers, cyclic ethers, and esters of mixtures thereof and a solute selected from the group consisting of LiAsF$_6$, LiCF$_3$SO$_3$, LiPF$_6$, LiClO$_4$, and mixtures thereof.

4. An electrochemical cell as claimed in claim 3, wherein the electrolyte is a solution of LiAsF$_6$ in a mixture of propylene carbonate and ethylene carbonate.

5. An electrochemical cell as claimed in claim 3, wherein the electrolyte is a solution of LiAsF$_6$ in a mixture of propylene carbonate, ethylene carbonate and dimethoxyethane.

* * * * *